Oct. 18, 1932.  A. VOIGT  1,883,171

LOCK

Filed May 30, 1930  4 Sheets-Sheet 1

INVENTOR
A. Voigt
BY
ATTORNEY

Patented Oct. 18, 1932

1,883,171

UNITED STATES PATENT OFFICE

ALBERT VOIGT, OF NEW YORK, N. Y.

LOCK

Application filed May 30, 1930. Serial No. 457,586.

This invention relates to locks particularly for use in connection with sliding doors for display cases and the like, as described in my co-pending application filed November 2, 1929, Serial No. 404,244, wherein the lock bolts are projected in spreading relation to each other from the inner surface of the door arranged with the lock by means exteriorly of the door to co-operate with a keeper extending perpendicular to the door jamb or in the exterior face of another door slidably mounted in the rear of the lock carrying door, whereas in the above application the bolts co-operate with a keeper in the door jamb or a door slidable, relative to the lock carrying door, and it is an object of the invention to provide such a lock which is efficient in use and inexpensive to manufacture.

It is another object of the invention to provide an improved manner to mount a pair of bolts upon an actuator carrier slidable in a casing on a wall thereof whereby upon the actuation of the carrier in one direction longitudinally of the lock casing the bolts are moved to locking position through an opening in the wall of the casing upon which the carrier is mounted.

It is a further object of the invention to provide means to retain the bolts in locking position comprising latch members pivoted and yieldingly urged into securing engagement with the bolt carrier and restricted to move in superposed relation to the bolt carrier and to each other.

It is still another object of the invention to provide means rotatably mounted on the bolt carrier and limited in its movement to engage and release a latch member from engagement with the bolt carrier by rotating said means in one direction.

It is still a further object of the invention to provide a casing supporting and enclosing the operative lock parts with a manipulating lock member extending beyond a wall thereof, and said casing adapted to be mounted in a channel shaped door frame by inserting the casing through an opening in a channel wall of the door frame having the extending manipulating lock member projecting through a plate slidably mounted in the channel wall of the door frame opposite to the frame wall arranged with the opening to permit the actuation of said manipulating member.

Another object of the invention is to provide a plate in juxtaposed relation to the working parts of the lock arranged to permit passage of a key and limit the actuating movement thereof.

A still further object of the invention is to provide another plate in juxtaposed relation to the working parts of the lock arranged to maintain a key barrel in position relative to the lock working parts.

Still another object of the invention is to provide a series of interchangeable latch plates relative to a bolt actuator carrier and arranged with different shaped key engaging portions, and adapting the interchanging of said plates for different key bit combinations.

Other objects and advantages will hereinafter appear.

In the drawings accompanying and forming a part of this application.

Figure 1:
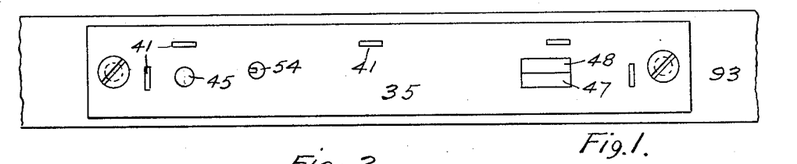
Figure 1 is a view of a lock mounted in a door frame looking at the interior of the door, only a portion of the door being shown in all the views.
Figure 2:
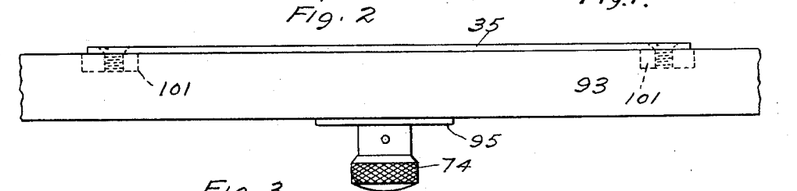
Figure 2 is a view looking at the bottom of Figure 1.
Figure 3:
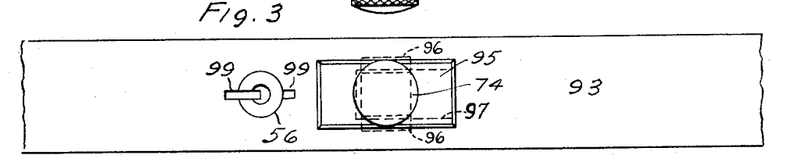
Figure 3 is a view looking at the bottom of Figure 2.
Figure 4:
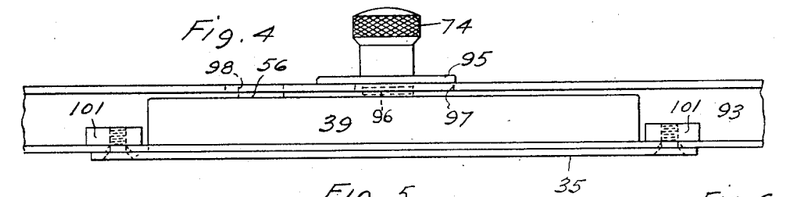
Figure 4 is a view of the lock mounted in the door frame looking toward the bottom of Figure 3 showing the channel formation of the door frame.
Figures 5, 6:
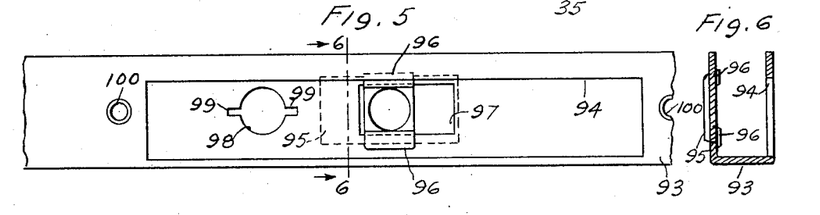
Figure 5 is a view of a section of the door frame viewed from the interior and showing the manner of mounting the lock.
Figure 6 is a sectional view of the door frame taken on line 6—6 of Figure 5 looking in the direction of the arrows.
Figures 7, 8:
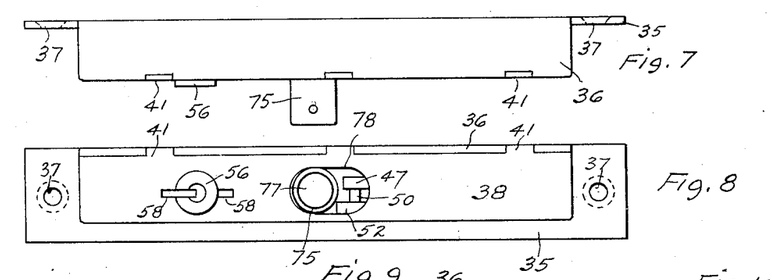
Figures 7 and 8 are side and front views of the assembled lock.
Figure 9:
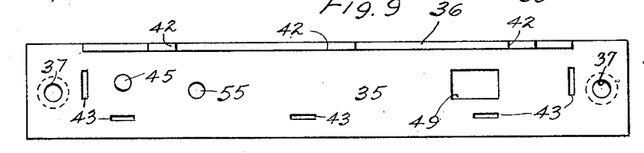
Figures 9 and 10 are plan and end elevational views, respectively, of a section of the lock casing.
Figure 10:
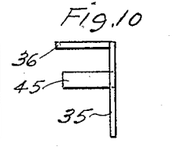
Figure 11:
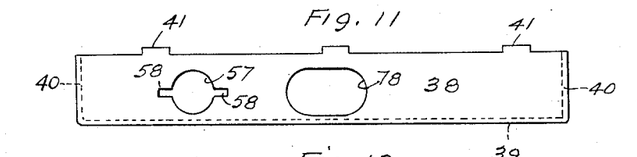
Figures 11 and 12 are plan and end views, respectively, of another section of the lock casing.
Figure 12:
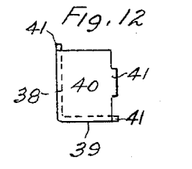
Figure 21:
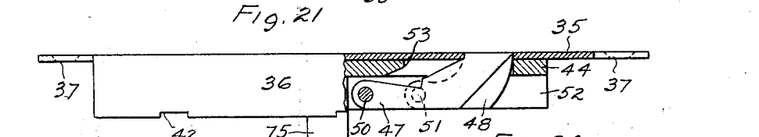
Figure 21 is a view similar to Figure 19 but showing the bolts in unlocking position, the bolt carrier being in the position shown in Figures 17 and 20.

In carrying out the invention there is provided a casing comprising a pair of sections, one section being of right angular formation in cross-section and adapted to support the working parts of the lock on an angle portion 35 thereof with the ends extended beyond the ends of the other angle portion 36 of said section (Figures 19 and 21) and said extended ends having perforations 37 for the passage of screws to secure the lock in a door frame to be hereinafter described. The other casing section (Figures 11 and 12) is also of right angular formation in cross section with an angle portion 38 of greater length than the length of the other angle portion 39 which is equal to the length of angle portion 36, so that the ends of the portion 38 extend a distance equal to the width of the portion 39 beyond the ends of the portion 39 and said ends are bent at right angles into contiguous relation with the ends of the portion 39, as at 40 (Figure 12), to form an enclosing section for the working parts of the lock assembled on casing section 35. The sections are assembled and secured together by providing the edges of the angle portions 38, 39 and 40 with tongues 41 to engage recesses 42 arranged in the upper edge of angle portion 36 and slots 43 in angle portion 35 in alinement with the ends of the angle member 36 and the free edge of the angle member 39, leaving a portion along the longitudinal side of the angle member 35 extending beyond the enclosing casing section, as said member is of greater width than that of angle member 38, for supporting the lock in a door frame.

Figures 13, 14:
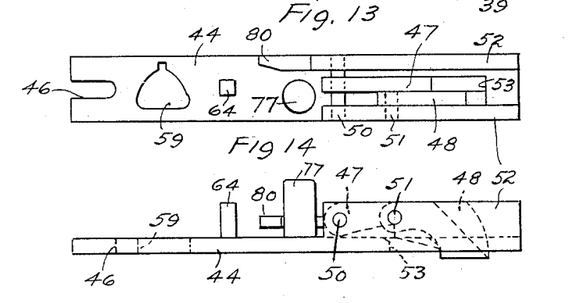
Figures 13 and 14 are plan and side views, respectively, of bolts and a carrier therefor.
Figure 15:
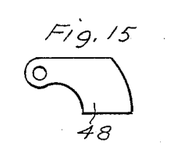
Figures 15 and 16 are views of the different bolts.
Figure 16:
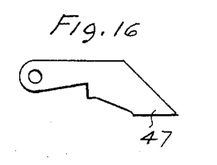
Figure 17:
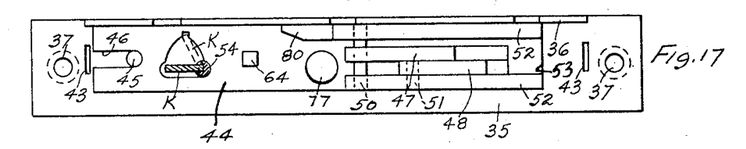
Figure 17 is a view of the bolts and carrier therefor assembled on the casing section shown in Figure 9 with the bolts in unlocking position.
Figure 18:
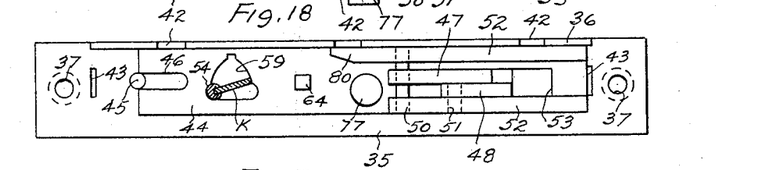
Figure 18 is a view similar to Figure 17 showing the bolts in locking position.
Figure 19:
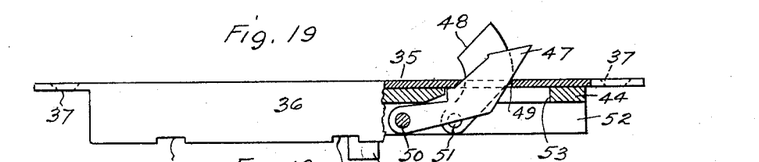
Figure 19 is a view looking at the top of Figure 18, with a portion of the casing section broken away to show the locking position of the bolts when the carrier is in the position shown in Figure 18.
Figure 20:
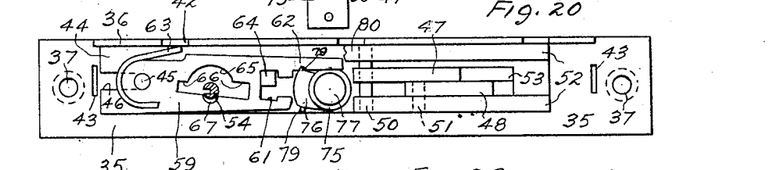
Figure 20 is a view similar to Figure 17 showing a latch member retaining the bolt carrier in unlocking position.

The lock mechanism is particularly constructed for use in connection with the locking of sliding doors when the keeper cannot be mounted in the door jamb, or when it is desired to lock a series of doors that are slidably mounted to permit the doors to pass each other, in which instance the keeper is mounted in the front frace of the door slidable in the rear of the door arranged with the lock. To provide such mechanism a bolt carrier in the form of a rectangular plate 44 is slidably supported on the casing member 35 to have movement thereon limited in one direction by a post 45 extending perpendicularly from said casing member to engage a recess 46 in the immediate end of the plate 44, and by moving the plate in the opposite direction a pair of bolts 47, 48 are forced through an opening 49 in the casing member 35 to extend therefrom in spreading relation to each other, as shown in Figure 19. Bolt 47 comprises a flat section arranged with a mounting portion at one end and having a perforation therein, and a straight outer edge extending from said perforation to a tongue or keeper engaging portion having a straight outer edge forming an obtuse angle with the mounting portion and constituting the locking edge with the inner edge of said tongue portion arranged with a series of cam portions. The bolt 48 is also of a flat section but of less length than bolt 47, said bolt having a perforated mounting portion at one end and a keeper engaging portion at the opposite end with the lateral edges of arcuate form, the inner edge constituting the locking edge thereof. The lower edges of the keeper engaging portions of the bolts are of such shape to fit snugly in the casing opening 49 and be guided by the opposite walls thereof, and in the position of the carrier with the recess 46 abutting post 45 (Figures 17 and 20) the end surfaces of the bolts are flush with the exterior surface of the casing member 35. The bolts 47, 48 are pivotally mounted on pins 50, 51, respectively, between wall members 52 (Figures 13 and 14) extended perpendicularly inward from the upper face and opposite longitudinal sides of and adjacent one end of the carrier 44 arranging said end portion of the plate to channel shape in cross section, and the wall members extend from the end of said plate opposite to the recessed end 46 to adjacent the center of the plate forming a channel between which the bolts are suspended into an opening 53 in the bolt carrier 44 relative to the casing opening 49 and of a length sufficient to permit swinging movement of the bolts during the actuation of the carrier plate 44 away from the pin 45, said swinging movement of the bolts being imparted thereto by the lateral edges of the bolts engaging the edges of the casing opening 49, the edges of said opening preferably being bevelled to assure ready movement of the bolts through the opening. The pin 50 supporting the bolt 47 is fixed at the ends in the channel walls 52 adjacent the inner ends of said walls, said bolt being contiguous to one of the walls, and the pin 51 is fixed at one end in the wall 52 farthest from the bolt 47 intermediate the ends of the wall and extends to the side of bolt 48 to pivotally support the same juxtaposed to the bolt 47 (Figures 18 and 20). The movement of the bolt carrier to actuate the bolts into locking position is limited by the end thereof abutting the casing end 40, as shown in Figure 18 relative to the slot 43 which indicates the position of wall 40.

The bolts are actuated into and out of locking position by a key K adapted to be inserted into the casing by engaging the same in a slot of a rotatable key barrel and guide 54 having one end of reduced diameter to seat in a perforation 55 in casing member 35, the opposite end having a circular head 56 with an annular enlargement or flanged portion at the juncture of the barrel and head, the shoulder formed by said flanged portion engaging the undersurface of and about the wall of a circular opening 57 in casing member 38 of substantially the same diameter as the barrel head. The opening 57 has opposed recesses 58 for the passage of the bit portion of the key. Upon the actuation of the key within the barrel the lowermost projection of the key bit will slidingly engage an arcuate side wall of a triangular perforation 59 arranged in the bolt carrier adjacent the recess 46 with the base angles also of arcuate formation, either of said angles being in engagement with the key barrel in either of the extreme positions of the bolt carrier, as shown in Figures 17 and 18. The key bit projection abuts a notch in the apex of the triangle as it approaches the center of its travel through an arc of substantially 180°, thereby moving the bolt carrier in the direction of the rotation of the key until the key bit extends in a direction opposite to that it assumed at the commencement of the actuation thereof; to actuate the bolts to their initial positions the key is rotated in the reverse direction.

Figure 22:
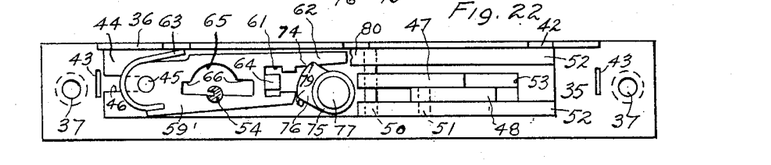
Figure 22 is a view similar to Figure 20 but showing the latch member actuated from bolt carrier retaining position.
Figure 23:
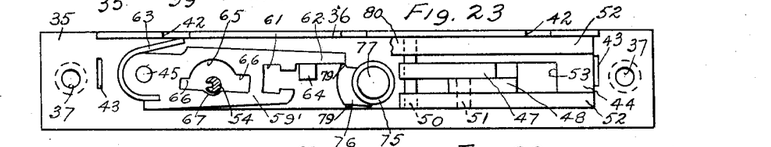
Figure 23 is a view similar to Figure 18 showing the bolts secured in locking position by the latch.

To prevent the bolts from being forced out of their locking positions by the shaking or jarring of the lock carrying door with consequent jolting of the bolt carrier into sliding movement toward the post 45, the bolts are secured in their locking positions by a series of latches 59', 60 adapted to be interchangeably mounted in the casing to form a multiplicity of key bit combinations, the variety of the combinations depending upon the number of latch members employed. In the present instance only two latches 59', 60 are illustrated, latch 59' being of rectangular plate form mounted at one end on a portion of post 45 extending above bolt carrier 44 to have pivoted movement in a plane extending in juxtaposed relation to the bolt carrier. The opposite end of said latch is arranged with a catch portion in the form of a recess 61 having the entrance thereto restricted by lugs or ears extending toward each other from the opposite walls of the recess with a wall of said recess projecting beyond one of the ears, as at 62, for a purpose to be hereinafter described. The bolt carrier 44 is maintained in bolt unlocking position by latch 59' being yieldingly urged by a spring 63 fastened at one end in a recess in the latch and curved about the mounting end thereof with the free end impinging against the casing wall 36, to position the catch portion and the ear thereof arranged with projection 62 into engagement with a squared projection 64, as shown in Figure 20, said projection 64 extending from the bolt carrier and being of such dimensions as to readily pass through the restricted entrance of the catch portion. To permit actuating the bolts into locking position the restricted entrance to the latch recess is positioned in alinement with the projection 64 during the actuation of the key to move the bolts into locking position by a portion of the key bit above the bolt carrier engaging bit projection engaging an arcuate portion of a perforation 65 in the latch and moving the restricted entrance into alinement with projection 64, said perforation having rectangular recesses 66 extending laterally of the ends of the arcuate wall to permit the passage of the key bit and the connecting wall of the recesses is arranged with an intermediate arcuate indent 67 to compensate for the key barrel during the movement of the latch, as shown in Figure 22. The perforation 65 is arranged relative to the perforation 59 in the bolt carrier so that upon the actuation of the key, the latch member is moved to position the restricted entrance to the latch recess 61 in alinement with the projection 64, as shown in Figure 22, before the key bit engages the notch of perforation 59, and the entrance of the latch recess is maintained in such position while the projection 64 is moved through the entrance, the latch assuming its normal position under the influence of spring 63 upon the completion of the actuation of the key with the projection 64 engaging the outer edge of the ear and the projection 62 of the wall of the latch recess 61 to maintain the bolts in locking position, as shown in Figure 23. To move the bolts to unlocking position the operation of latch 59' is similar to that above described the projection 64 being moved in the opposite direction by the actuation of the key in the opposite direction.

Figure 25:
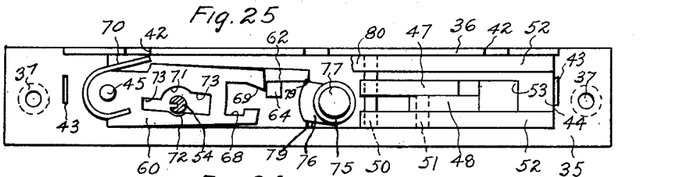
Figure 25 is a view similar to Figure 23 showing the additional latch securing the bolts in the locking position shown in Figure 19.

The latch 60 is similar to latch 59', it being pivotally mounted at one end on the post 45 in juxtaposed relation to the latch 59' and having a recessed portion 68 at the opposite end with the entrance thereto restricted by a pair of opposed ears, or lugs extended toward each other from the opposite walls of the recess and providing a space between the ears slightly larger than the width of the bolt carrier projection 64, the opposed face of one of the ears declining toward the recess, as at 69, with the wall of the recess adjacent said latter ear yieldingly urged into engagement with the projection 64 by a spring 70 mounted on the latch 60, similar to the mounting of spring 63, to impinge against the casing wall 36. During the actuation of the bolt carrier into bolt locking position the projection 64 slides along the inclined wall of the ear 69 moving the adjacent end of latch 60 toward the casing wall 36 and after the passage of the projection 64 relative to the latch ear 69 the latch 60 assumes its normal position with the end of the ear 69 engaging the projection 64 in juxtaposed relation to the engagement of the latch 59' with said projection, as shown in Figure 25. To disengage the ear 69 from the bolt carrier projection 64 to permit of movement of the bolts to unlocking position a portion of the key bit above the bit portion engaging the latch perforation 65, is adapted to engage an arcuate wall porton of a perforation 71 in latch 60 the wall of the perforation extending in a straight plane beyond the arcuate portion of latch perforation 65 and corresponding to the formation of the key bit so that the actuation of the key will simultaneously move the latches 59, 60 against the tension of springs 63, 70 to aline the entrances of the latch recesses relative to the bolt carrier projection 64 permitting the actuation of the bolt carrier to bolt unlocking position. The wall of the latch perforaton 71 opposite the arcuate portion extends in a straight plane and is arranged intermediate the ends with an arcuate recess 72 to compensate for the key barrel 54 permitting the actuation of the latch. The straight plane walls of the recess form rectangular recesses 73 extending laterally from the arcuate portions to permit the passage of the key. The sliding movement of the projection 64 along the latch ear 69 to secure the bolts in locking position is facilitated by the key engaging the upper arcuate portion of the perforation 71 and moving the latch recess 68 toward the casing wall 36.

It is understood that any number of latches of similar shape and arrangement as latch 60 may be used and pivotally mounted on the post 45 in juxtaposed relation to each other having the key bit engaging perforations arranged to correspond to and be actuated by a predetermined key bit formation to provide locks adapted to be actuated by keys having a wide range of different combinations of bit formations.

The movement of the latches 59', 60 under the influence of the springs 63, 70 away from the casing wall 36 is limited by the engagement of the latch recesses 61, 68 with the post 64 in the bolt unlocking position of the bolt carrier. In the bolt locking position of the bolt carrier the wall of the recess with the projection 62 of latch 59' abuts the post 64 and the latch 60 abuts the casing wall 39.

Figure 24:
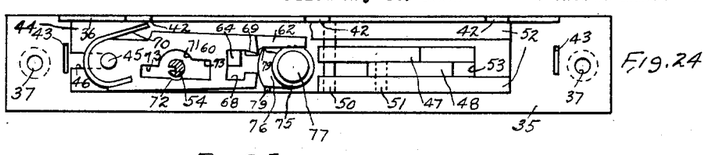
Figure 24 is a view similar to Figure 20 but arranged with an additional latch member.

The bolts are adapted to be actuated into locking position without a key by the actuation of a manipulating finger knob 74 fixed by a pin on one end of a tubular member 75 having a cam projection 76 extending laterally from the opposite end in juxtaposed relation to the bolt carrier, said tubular member being rotatably mounted on a post 77 projecting perpendicularly from the face of the bolt carrier 44 to position the tubular member through an elongated opening 78 in casing wall 38 with the manipulating finger knob connected thereto at the outer side of said wall. Upon the turning of the knob 74 in clockwise direction the cam 76 engages projection 62 of latch 59' moving the latch toward the casing wall 36 to aline the entrance to the latch recess 61 relative to the bolt carrier projection 64, and in said position of the cam a pushing or pulling force exerted on the knob in a direction longitudinally of the casing and toward the bolts will force the carrier projection past the latch ear 69 and actuate the bolts to locking position. The cam 76 is of such shape to permit free movement thereof without interfering with the pivotal movement of the latch 59', as shown in Figure 22, or of the latch 60, as shown in Figure 24, and the rotative movement of the cam manipulating member is limited by protuberances 79 extending from the sides of the cam projection, one of the protuberances adapted to abut a tongue 80 extending from the end of channel wall 52 adjacent the casing wall 36 in parallel and spaced relation to the bolt carrying plate, the space between said tongue and plate being sufficient to permit the passage of the latch projection 62 below the tongue and maintain the projection end of the latch in juxtaposed relation to the bolt carrier, said end having a tendency to be forced in an upward direction by the force of spring 63. The other cam protuberance 79 abuts the casing wall 39 and is of such length to position the cam projection adjacent to the latch projection 62, as shown in Figures 20 and 23, in the bolt unlocking and locking positions of the carrier.

To unlock the bolts after being actuated into locking position by the manipulating knob the key has to be used as hereinbefore described because the manipulating knob has no operative connection with the other latch members in the bolt locking position of the bolt carrier, but the lock may be utilized simply as a latch mechanism by assembling the lock with only the latch 59' mounted relative to the bolt carrier, and in a structure of this character the bolts are actuated into and out of locking position by rotating the manipulating finger knob toward the casing wall 36 and longitudinally moving the same in the desired direction, toward or away from the bolts, positioning the bolts in locking or unlocking position, respectively.

Figure 26:
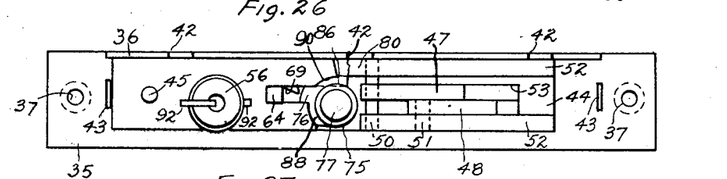
Figure 26 is a plan view showing the working parts of the lock completely assembled on the casing section shown in Figure 9.
Figure 27:
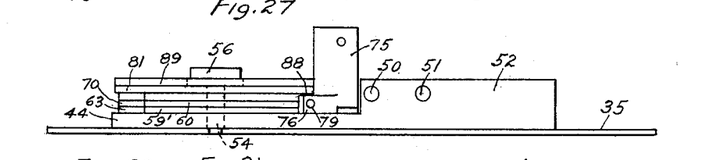
Figure 27 is a view looking at the bottom of Figure 26.
Figure 28:
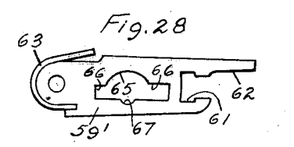
Figures 28 and 29 are elevational views of the latch members shown in Figures 20 and 22 to 25, inclusive.
Figure 29:
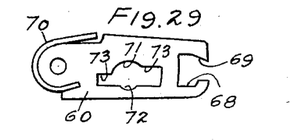
Figure 30:
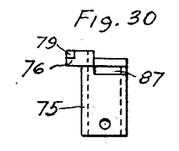
Figure 30 is a side elevation of an actuator to release a latch from the bolt carrier and actuate the bolt carrier to move the bolts to locking position.
Figure 31:
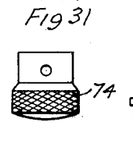
Figure 31 is a view of a knob to be mounted on the actuator shown in Figure 30.
Figure 32:
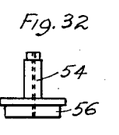
Figure 32 is a side elevation of a key barrel and guide shown in Figures 26 and 27.
Figure 33:
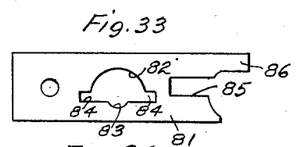
Figure 33 is a view of a plate mounted in juxtaposed relation to the top latch member to limit the movement of the key.

To limit the rotative movement of the key and indicate in what direction the key may be actuated, a rectangular plate 81, (Figure 33) is mounted at one end upon the post 45 in juxtaposed relation to the top latch, in the present instance latch 60, and having a perforation intermediate the ends arranged with an arcuate wall portion 82 adjacent the casing wall 36 of a greater radius than the arcuate portions of the latch perforations 65, 71 to permit free movement of the key. The opposite wall of said perforation extends substantially parallel to the longitudinal edges of the plate and has an arcuate recess 83 for the mounting of the key barrel, and rectangular recesses 84 for the passage of the key bit. The wall of the plate perforation opposite the arcuate wall 82 serves as a stop for the key. The end of the plate opposite to the mounting end has a rectangular recess 85 extending longitudinally of the plate and terminating adjacent to the plate perforation for the passage of the bolt carrier projection 64, in the longitudinal movement thereof, the entrance to said recess 85 being of curved formation and having a side 86 thereof extending into a slot 87 arranged in the wall of the manipulating knob carrying member 75, as shown in dotted lines in Figure 26, and the opposite side wall of the entrance extends in juxtaposed relation the actuating cam projection 76, as at 88, (Figure 27) and both of said entrance portions being in such positions when the bolt carrier is in bolt unlocking position, and in the bolt locking position of the carrier the cam is engaged by the entrance side 86. Therefore, in all positions of the bolt carrier the cam 76 is maintained in position relative to latch projection 62.

Figure 34:
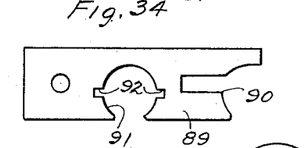
Figure 34 is a view of a plate mounted in juxtaposed relation to the plate shown in Figure 33 to engage and maintain the key barrel in alinement with the working parts of the lock.
Figure 35:
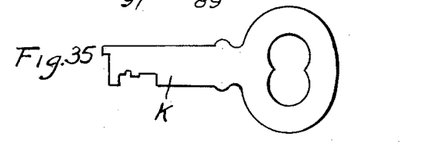
Figure 35 is a side view of a key for actuating the latches and bolt carrier of the lock.

To maintain the key barrel in alinement with the key engaging perforations of the bolt carrier and the latches a plate 89 (Figure 34) similar to the key limiting plate 81, is mounted at one end on the post 45 in juxtaposed relation to the plate 81 with the opposite end arranged, as at 90, to correspond with the adjacent end of the plate 81 to permit movement of the bolt carrier projection 64 and the actuation of the manipulating member 75. The plate 89 is arranged intermediate the ends with a circular recess 91 extending inward from the edges of the plate which extends contiguous to the casing wall 39, said recess being of a size to engage the annular enlargement or flanged portion of the barrel head 56. The circumferential wall is further arranged with recesses 92 extending in alinement with recesses 58, 66, 73 and 84 in casing member 38, latches 59', 60 and plate 81, respectively, to permit the passage of the key K.

Upon the mounting of the key barrel alining plate 89 the operative lock parts are completely assembled. The key barrel may be seated in the casing perforation 55 after the assembling of the locking parts and then the enclosing casing section 38 is positioned and connected to the other casing section 35, as hereinbefore described, the manipulating knob 74 not being mounted on the tubular member to permit projecting the tubular member through the casing opening 78.

The lock is shown as being mounted in a metal door frame 93 of channel shape in cross-section but it may be mounted in any desirable type of door as by mortising, or in the case of a channel shaped door frame cutting an opening 94 in a channel wall of a size to permit the insertion of the enclosing section 38 of the casing with the tubular member 75 passing through a perforated plate 95 arranged with offset flanges 96 for slidably mounting the plate in a rectangular opening 97 in the channel wall of the door frame opposite to the wall arranged with the opening 94 to permit the longitudinal manipulation of the knob 74, and the head of the key barrel is positioned in register with an opening 98 in the door frame channel wall arranged with the opening 97 having opposed recesses 99 for the passage of the key. When the lock is inserted in the door frame as described the portions of the casing wall 35 extending beyond the walls 39, 40 of the enclosing casing section, abut the peripheral portions of the door frame opening 94 and the screw openings 37 of the lock casing wall 35 are in alinement with openings 100 adjacent the end walls of the door frame opening 94 and threaded bores in blocks 101 fixed to the inner surface of the door frame channel wall relative to the openings 100 for the threaded engagement of headed screws passing through the openings 37 and 100 to secure the lock within the door frame channel. The manipulating finger knob 74 is now positioned and fastened on the projecting portion of the tubular member.

Having thus described my invention, I claim:

1. In a lock, a casing arranged with an opening, a plate longitudinally slidable in the casing, a pair of bolts arranged in sidewise juxtaposed relation pivotally mounted on the plate with the free ends of the bolts in register with the casing opening and substantially flush with the outer face of the casing in the unlocking position of the bolts, and the bolts having cam edges to engage opposite wall portions of the casing opening to transmit the movement of the plate to movement of the bolts laterally of the plane of movement of the plate and laterally of each other and the casing opening in a direction longitudinal of the plate and hold the bolts against movement when in projected position.

2. In a lock, a casing arranged with an opening, a plate slidable in the casing, bolts pivotally mounted on the plate on axes extending parallelly of the plane of the plate with the free ends of the bolts in register with the casing opening in the unlocking position thereof and adapted to be projected therethrough to locking position by the actuation of the plate, a pivoted latch yieldingly urged into engagement with the plate to releasably retain the plate and bolts in predetermined positions, and means rotatably carried by the plate operative to release the latch from the plate to actuate the plate and bolts.

3. In a lock, a casing arranged with an opening, a plate slidable in the casing and having a projection, bolts pivotally mounted on the plate on axes extending parallelly of the plane of the plate with the free ends of the bolts in register with the casing opening in unlocking position, and adapted to be propelled therethrough to locking position by the actuation of the plate in one direction, and a pivoted latch arranged with a catch portion adapted for engagement of the plate projection and retain the plate against movement with the bolts in locking and unlocking positions and yieldingly urged to position for engagement by the plate projection, and a finger manipulable member carried by the plate to actuate the latch to release the catch portion from the plate projection and actuate the plate to move the bolts to locking position.

4. In a lock, a casing arranged with an opening, a plate slidable in the casing, bolts pivotally mounted on the plate on axes extending parallelly of the plane of the plate with the free ends of the bolt members in register with the casing opening in unlocking position and adapted to be projected therethrough to locking position by the actuation of the plate, a pivoted latch yieldingly urged to a predetermined position and cooperate with the plate to retain the plate and bolts in locking and unlocking positions, and a rotatable cam carried by the plate and operative to release the latch from the plate and permit actuation of the plate and bolts to locking and unlocking positions.

5. The combination of a lock including a casing enclosing the operative lock parts and having a lock manipulating member extending from a wall thereof, and a channel shaped door frame arranged with openings in the opposite sides thereof, one of said openings being larger than the other and adapted for the inserting and mounting of the lock casing in the frame, and a plate slidably mounted in the smaller opening and through which plate the lock manipulating member is extended to the exterior of the door frame.

6. In a lock, a casing having an opening through the wall thereof, a plate longitudinally movable in the casing and juxtaposed to the casing wall with the opening, a bolt pivotally mounted on the plate to have movement on an axis extending transversely of the plate, the free end of said bolt being in register with the casing opening in the unlocking position thereof and adapted to be projected through the casing opening to locking position by the movement of the plate in one direction, latch mechanism to co-operate with and retain the plate with the bolt in locking and unlocking positions, means arranged with a manipulating knob to release the bolt carrying plate from the latch mechanism and actuate the plate to move the bolt to locking position, said latch mechanism being automatically operative to retain the plate with the bolt in said locking position and operative to prevent actuation of the plate to move the bolt to unlocking position by the knob manipulated means, and said latch mechanism adapted to be released from the plate by a key and the plate actuated by the key to move the bolt to locking and unlocking positions.

7. In a lock, a casing, a bolt, a carrier for said bolt supported in the casing to have longitudinal movement and said bolt to have movement laterally of the plane of movement of the carrier, means pivoted in the casing automatically co-operating with the bolt carrier, when the carrier is actuated to move the bolt to locking and unlocking positions, to retain the carrier in either of said positions, finger manipulating means connected with the bolt carrier and extended through an opening in the casing to the exterior thereof to release the carrier retaining means from the carrier and actuate the bolt carrier to move the bolt to locking position, and said carrier retaining means adapted to be released from the carrier and the carrier actuated to move the bolts to locking and unlocking positions by a removable key.

8. In a lock, a casing arranged with an opening, a plate slidable in the casing and having an opening therein, and bolts pivotally mounted on the plate on axes extending transversely of the plate to have movement laterally of the plate and the free ends of the bolts extended through the plate opening and adapted to register with the casing opening in the unlocking position of the bolts, and said bolts adapted to be projected through the casing opening by the movement of the plate in one direction, and the bolts guided by opposite wall portions of the casing opening to direct the bolts to extend in opposite directions longitudinally of the plate, and guided by the opening wall into the casing by the movement of the plate in the opposite direction.

9. In a lock, a casing arranged with an opening in the wall, a plate slidable in the casing juxtaposed to the casing wall and having an elongated opening relative to the casing opening, a pair of bolts arranged in sidewise juxtaposed relation pivotally carried by the plate to normally extend through the plate opening into register with the casing opening in the unlocking position of the bolts and adapted to be projected through said casing opening by the movement of the plate in one direction, and said bolts arranged with cam edges to engage with and be guided by the wall of the casing opening to direct the bolts in opposite directions longitudinally of the plate as they are projected through the casing opening, means to releasably hold the plate in positions with the bolts in locking or unlocking positions, and finger manipulable means to release said means from the plate and move the plate to locking position, and said means adapted to be released from the plate and the plate actuated to move the bolts to unlocking position by a removable key.

10. A lock as claimed in claim 9, wherein the plate is arranged with a channel portion relative to the opening therein and between the legs of which channel portion the bolts are pivotally supported.

11. In a lock, a casing arranged with an opening in the wall thereof, a plate mounted in the casing with one side in slidable engagement with the casing wall having the opening and the plate having an opening in communication with the casing opening in all positions of the plate and a projection extended from the opposite side thereof, bolts pivotally mounted on the plate to have movement on an axis extending transversely of the plate with the free ends extended through the plate opening and in register with the casing opening in the unlocking position thereof and adapted to be projected through the casing opening to locking position by the actuation of the plate in one direction, a latch pivoted at one end in the casing and juxtaposed to the bolt carrying plate, said latch having a recess in the opposite end with ears extending toward each other from the opposite walls of the recess, means to yieldingly urge the latch to engage a recess wall with the plate projection at either side of a recess ear to releasably retain the plate and bolts in locking and unlocking positions, and a finger manipulating member connected with the plate operative to release the latch from the plate projection and actuate the plate to move the bolts to locking position.

12. In a lock as claimed in claim 11, a second latch pivoted at one end on the pivot of and juxtaposed to the first latch, said second latch having a recess in the opposite end with ears extended toward each other from the opposite walls of the recess, means to yieldingly urge said latch to engage a wall of the recess with the plate projection at either side of a recess ear for engagement of said plate projection with the ear to hold the bolt carrying plate in locking position, and said ear having one edge bevelled and the plate projection adapted to ride up said surface to move the latch to releasing position as the bolt carrying plate is moved to locking position, and said latches adapted to be moved to releasing position and the bolt carrying plate to locking and unlocking positions by a removable key.

13. In a lock, a casing arranged with an opening in the wall thereof, a plate slidable in the casing with one side juxtaposed to the wall portion with the opening, said plate having a projection extended from the opposite side and having an opening in communication with the casing opening in all positions of the plate, bolts pivotally mounted on the plate to have movement on axes extending transversely of the plate with the free ends of the bolts extended through the plate opening in register with the casing opening in the unlocking position thereof and adapted to be projected through the casing opening to locking position by the actuation of the plate in one direction, a latch pivoted at one end in the casing and juxtaposed to the plate, said latch having a recess in the opposite end for engagement and passage of the plate projection during the sliding movement of the bolt carrying plate and having an obstruction at the entrance to the recess for engagement of the plate projection to hold the plate in position with the bolts in locking and unlocking positions, means to yieldingly urge the latch to position with the recess obstruction for engagement with the plate projection to releasably hold the plate with the bolts in locking and unlocking positions, means rotatably carried by the plate to engage and release the latch from the plate projection and position the latch for the passage of the plate projection into and out of the latch recess and actuate the plate to move the bolts to locking position, and a second latch pivoted at one end and juxtaposed to the first latch and having a recess in the opposite end for engagement and passage of the plate projection during the sliding movement of the bolt carrying plate and having an obstruction at the entrance to the recess for engagement of the plate projection to hold the plate against movement with the bolts in locking position, and said obstruction arranged to permit of the passage of the plate projection when the first latch is released and the bolt carrying plate is moved to locking position, means to yieldingly urge the second latch to position with the recess wall in engagement with the plate projection to releasably hold the plate with the bolts in locking position, and both of said latches adapted to be released by a key from engagement with the plate projection and the bolt carrying plate actuated to locking and unlocking positions.

Signed at Brooklyn, in the county of Kings, and State of New York this 27th day of May, A. D., 1930.

ALBERT VOIGT.